Nov. 25, 1952 — E. MARTIN — 2,619,182
PROPELLER CONTROL
Filed Aug. 9, 1945 — 9 Sheets-Sheet 1

Inventor
Erie Martin
By Harris G. Luther
Attorney

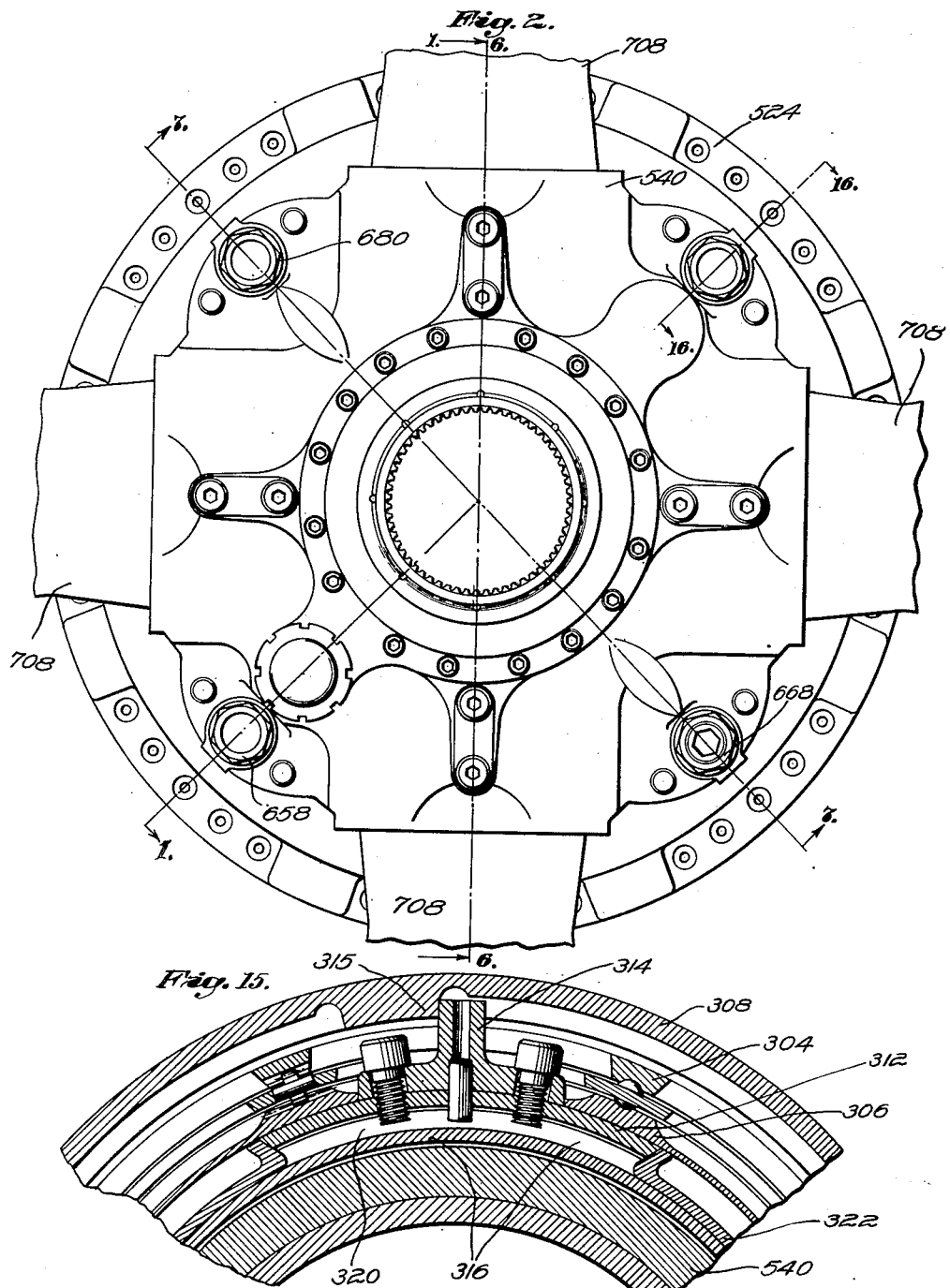

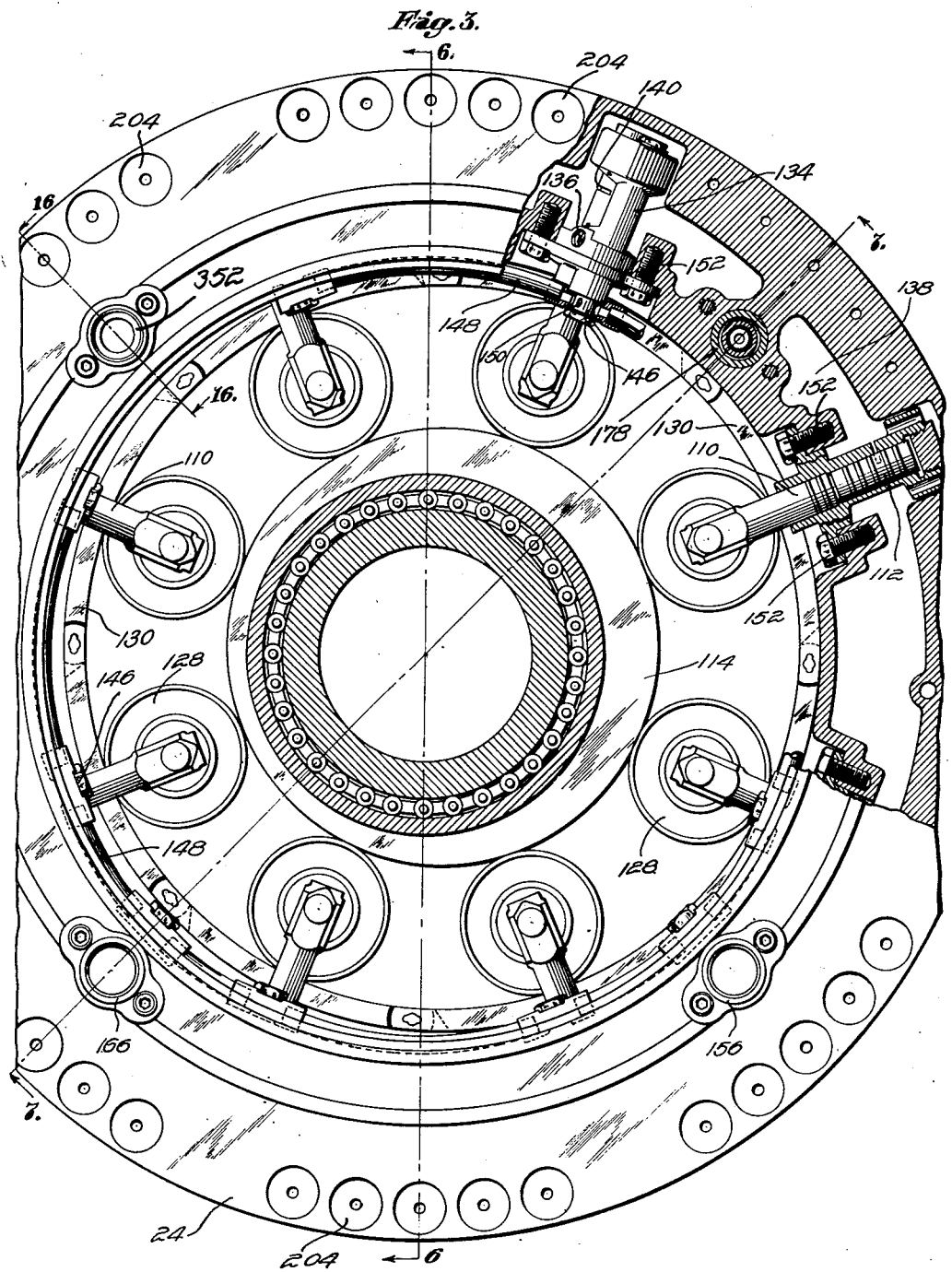

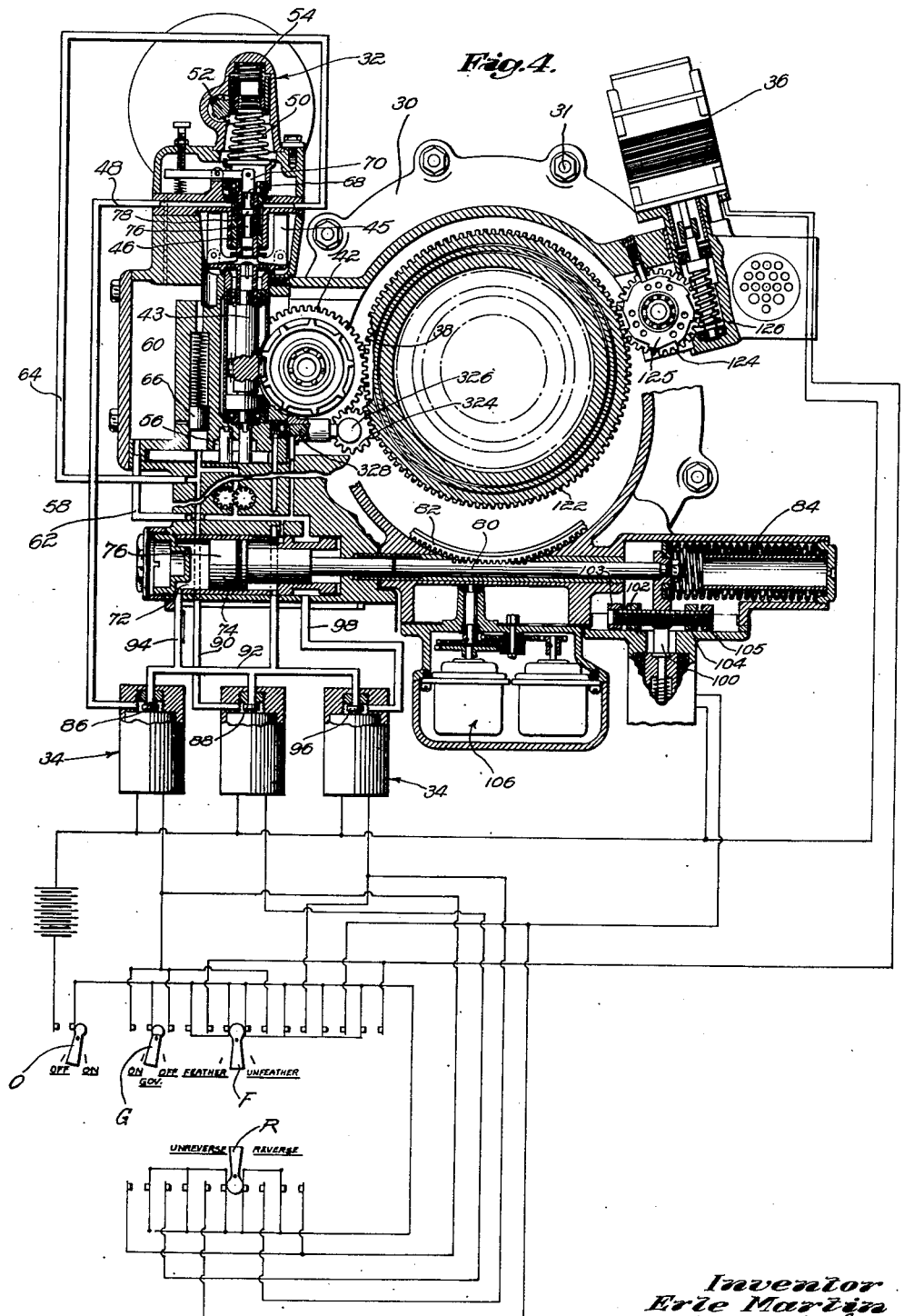

Nov. 25, 1952     E. MARTIN     2,619,182
PROPELLER CONTROL
Filed Aug. 9, 1945     9 Sheets-Sheet 5
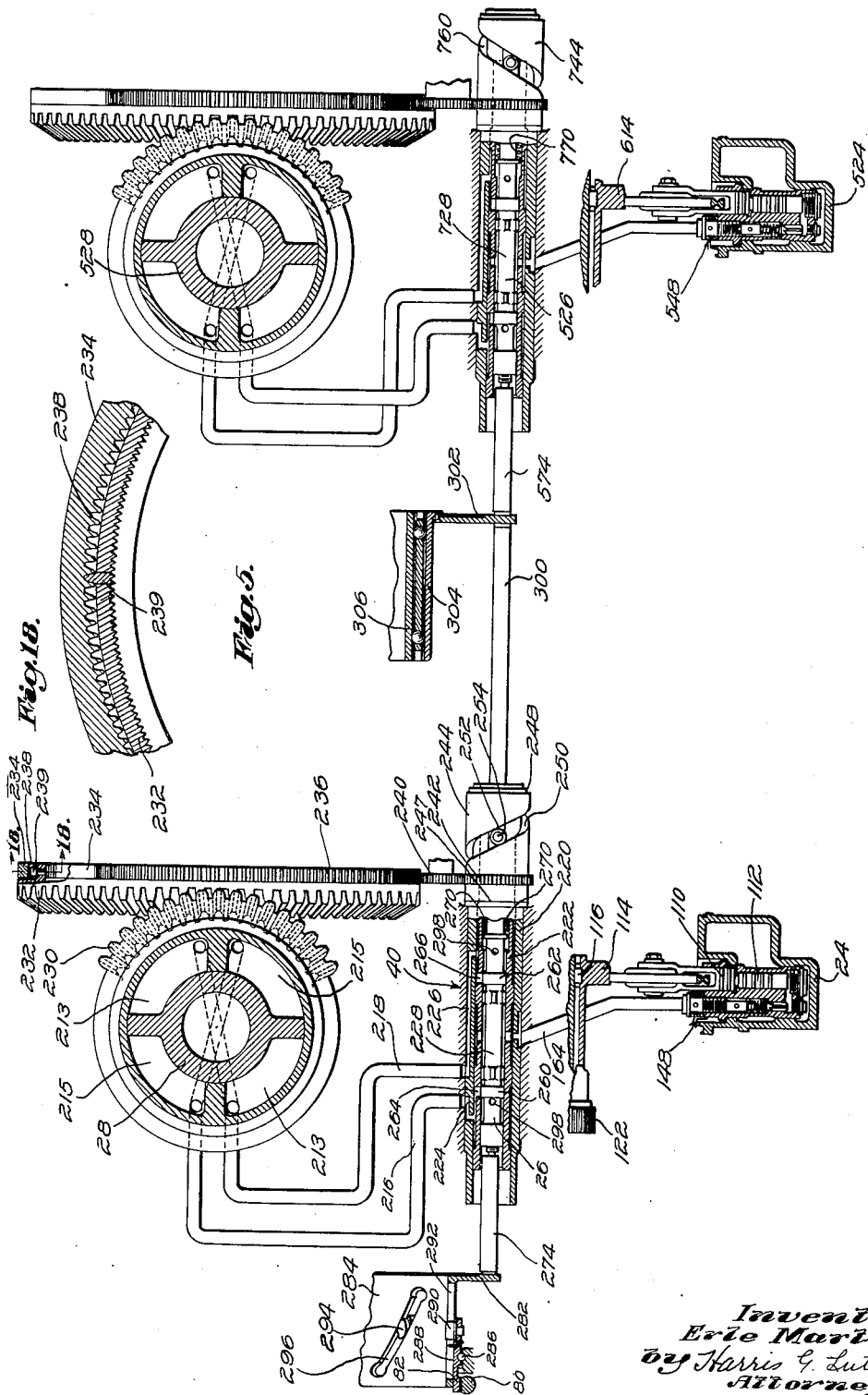

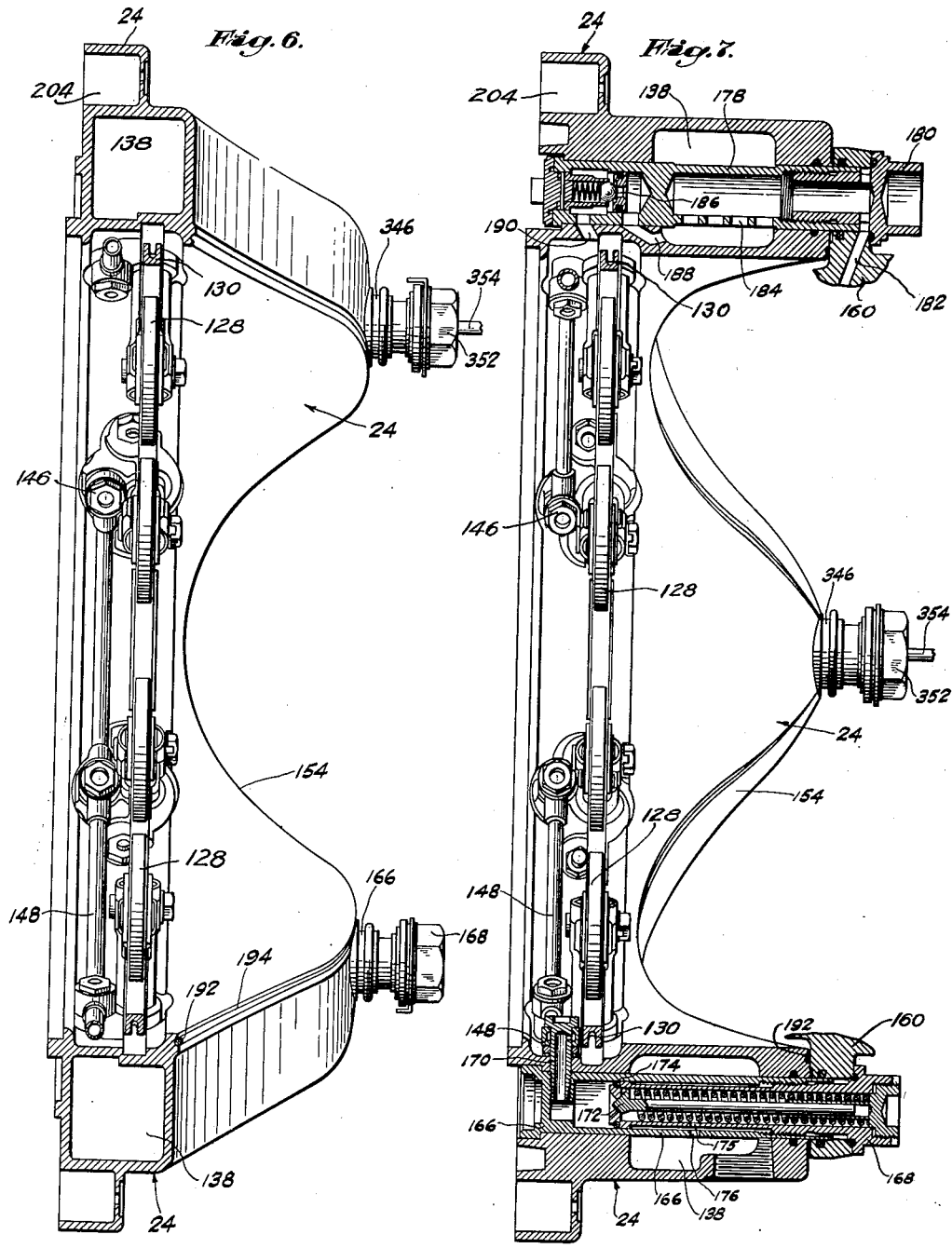

Nov. 25, 1952 — E. MARTIN — 2,619,182
PROPELLER CONTROL
Filed Aug. 9, 1945 — 9 Sheets-Sheet 7
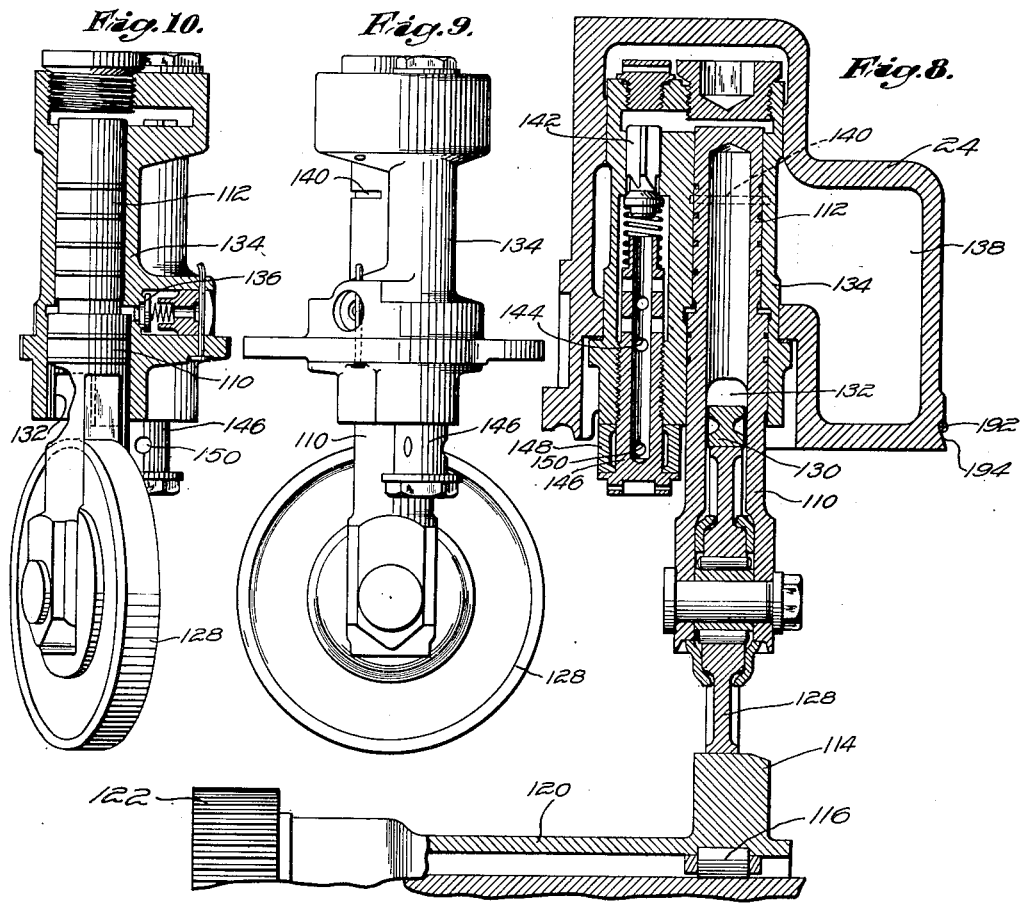
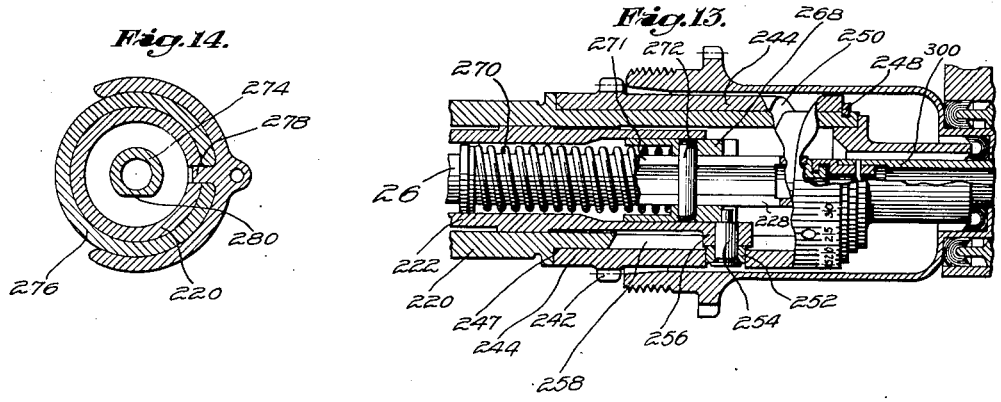
Inventor
Erie Martin
by Harris G. Luther
Attorney Nov. 25, 1952  E. MARTIN  2,619,182
PROPELLER CONTROL Filed Aug. 9, 1945  9 Sheets-Sheet 8

Inventor
Erie Martin
by Harris G. Luther
Attorney

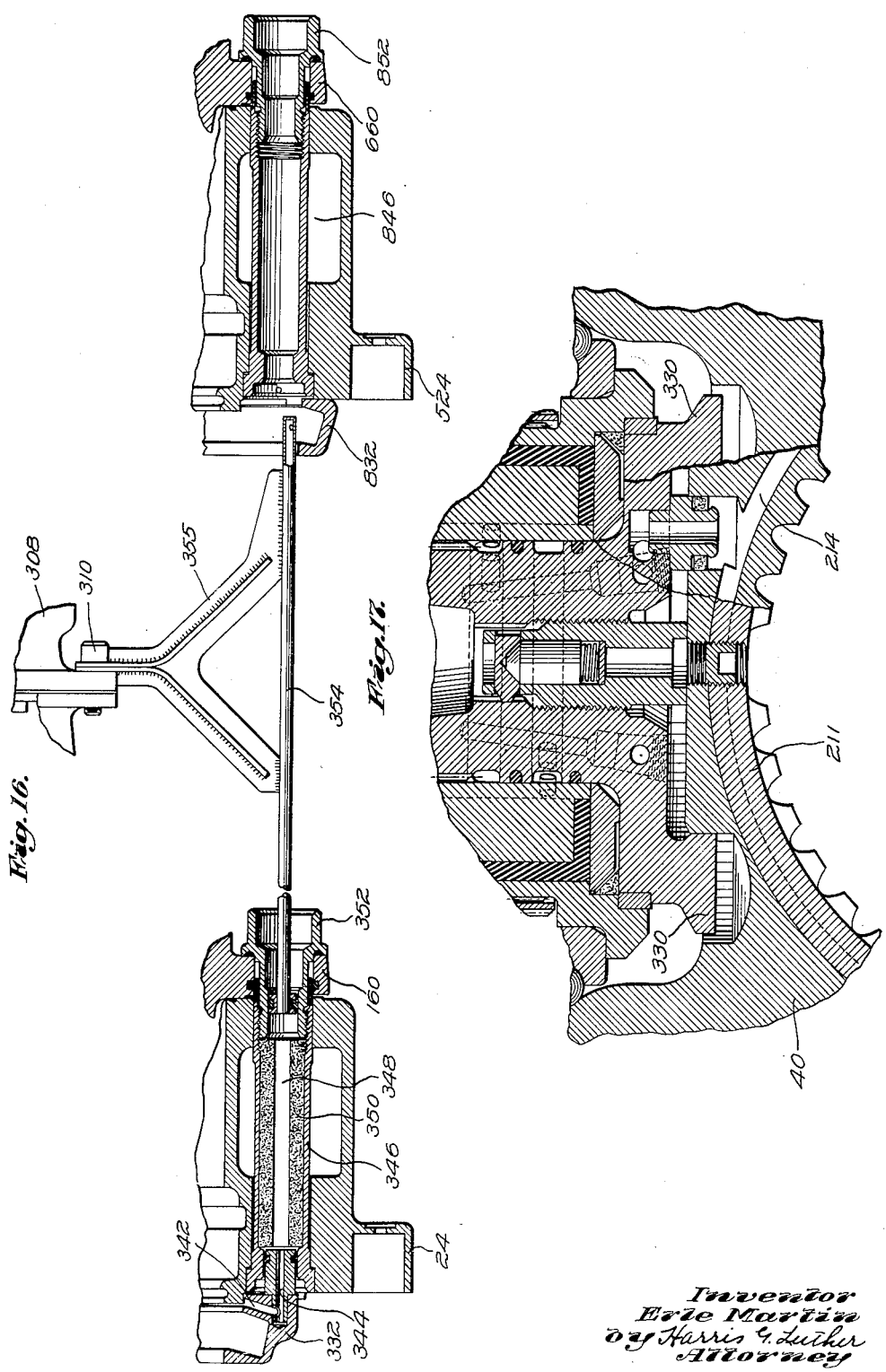

Patented Nov. 25, 1952

2,619,182

UNITED STATES PATENT OFFICE 2,619,182

PROPELLER CONTROL

Erle Martin, West Hartford, Conn., assignor to United Aircraft Corporation, East Hartford, Conn., a corporation of Delaware Application August 9, 1945, Serial No. 609,843

30 Claims. (Cl. 170—135.27)

This invention relates to propeller systems and more particularly to aircraft propeller systems utilizing propellers of the oppositely rotating coaxial type.

An object of this invention is a propeller system having improved means for substantially simultaneously adjusting the pitch of the blades of both propellers.

Another object is a propeller system having improved means for adjusting the pitch of the blades of each propeller in predetermined relation to the pitch of the blades of the other propeller.

Another object of this invention is a propeller of the above type which may be feathered and reversed.

Another object of this invention is a propeller of the above type which may be controlled either automatically or manually.

Another object of this invention is a propeller of the above type having means for changing the pitch of blades of the propeller while not rotating.

Another object of this invention is a propeller system in which each unit has its own hydraulic system and both units are simultaneously controlled from a single control device.

Other objects and advantages will be apparent from the specification and claims and from the accompanying drawings which illustrate what is now considered to be a preferred embodiment of the invention.

In the drawings,

Fig. 2 is an end view looking at the front end of the propeller.

Fig. 3 is an end view, partly in section looking at the rear of the propeller and showing the pump and sump section.

Fig. 4 is a transverse sectional view taken at the rear of the propeller and looking toward the engine and showing the control assembly with portions of the view shown schematically.

Fig. 5 is a schematic view showing the relation of the various parts and illustrating the manner in which the pitch of the two propellers is controlled.

Fig. 6 is a section through the pump and sump section taken on the line 6—6 of Figs. 2 and 3.

Fig. 7 is a section through the pump and sump section taken on the line 7—7 of Figs. 2 and 3.

Fig. 8 is a longitudinal section through one of the pump units showing the sump and operating cam.

Fig. 9 is a side elevation of a pump unit.

Fig. 10 is a longitudinal section through the pump unit on a different plane than Fig. 8 showing the first stage discharge valve.

Fig. 13 is an enlarged sectional view, with portions shown in full, on lines 13—13 of Fig. 11, through the forward end of the control valve of the rear propeller.

Fig. 14 is a section on lines 14—14 of Fig. 1.

Fig. 15 is a section on lines 15—15 of Fig. 1 showing the cam drive for the front propeller and the interpropeller transfer flange.

Fig. 16 is a section on lines 16—16 of Figs. 2 and 3 showing the deicing fluid conduit for the front propeller.

Fig. 17 is a section through the base of the blade and the vane motor, showing a fluid connection between the hub and the vane motor, and Fig. 18 is a detail showing the registering and drive means for the drive gear for the follow-up portion of the control valve.

Figure 1:
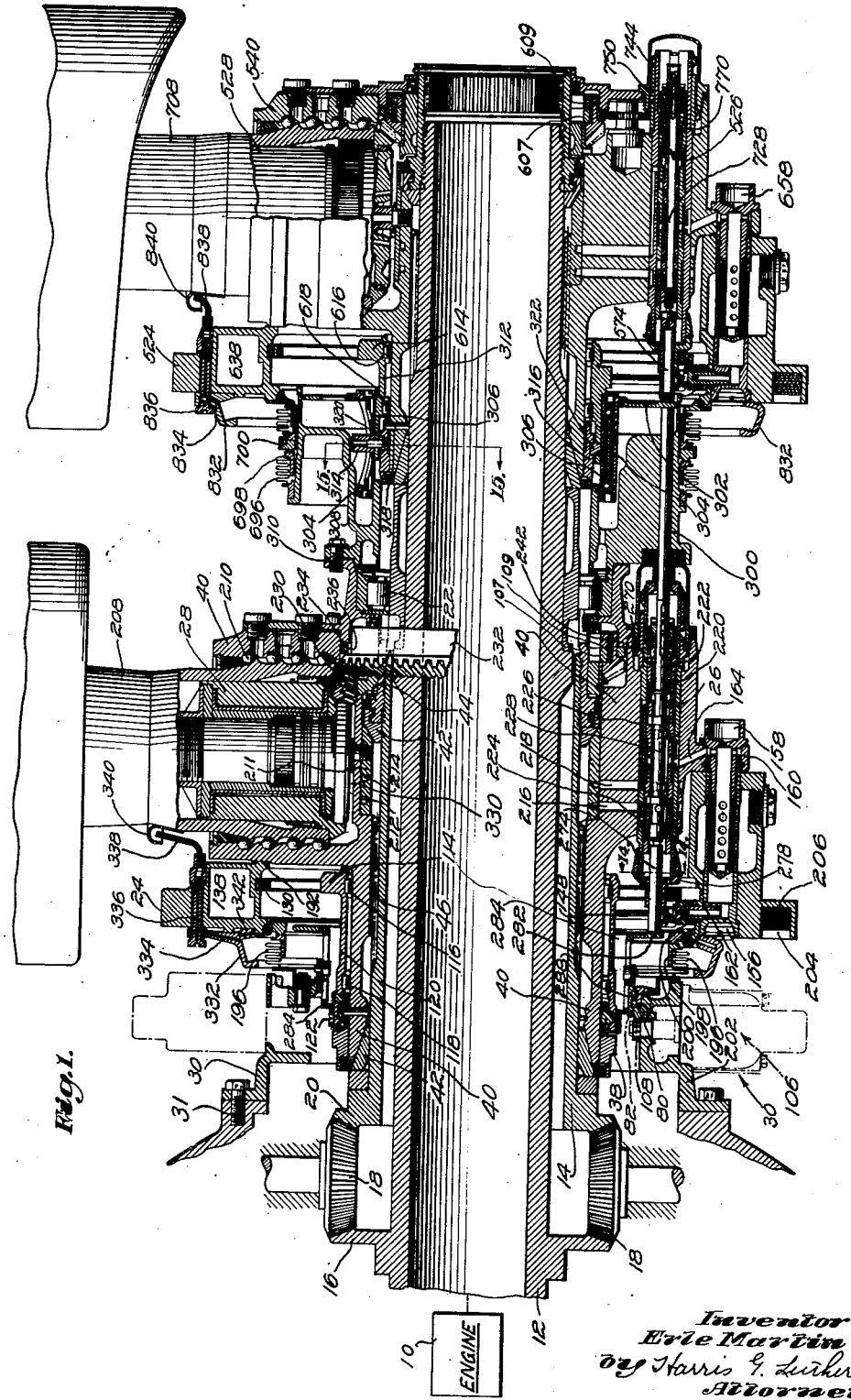
Fig. 1 is a side view largely in section, taken along the line 1—1 of Fig. 2, showing the assembled propeller with both propeller units in operative relationship.
Figure 11:
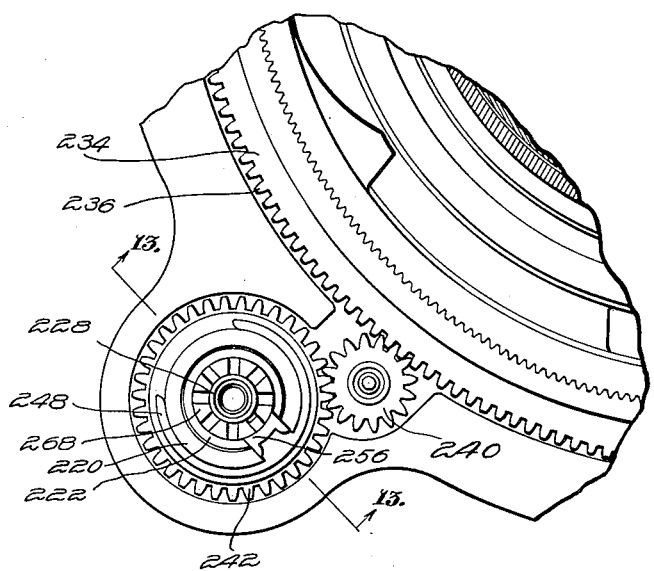
Fig. 11 is a front elevation of actuating gears for the control valve of the rear propeller.
Figure 12:
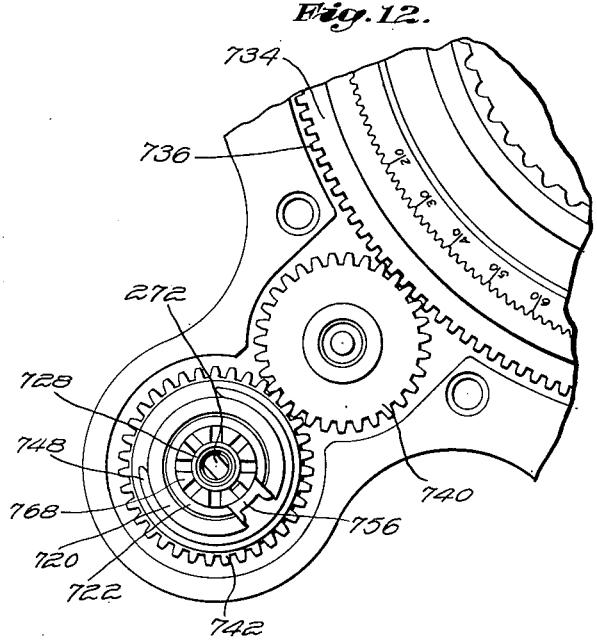
Fig. 12 is a front elevation of the actuating gears for the control valve of the front propeller.

This invention relates to coaxial oppositely rotating propellers, sometimes called dual-rotation propellers. Such a propeller comprises a rear propeller and a front propeller usually mounted on telescopically arranged, concentric, oppositely rotating propeller shafts, one propeller being mounted on each shaft. The two propellers are placed as close to each other as is practical and, in order to have both propellers give a useful thrust in the same direction, the pitch of the rear propeller is opposite to that of the front propeller because it is rotating in the opposite direction.

Provision is made for substantially simultaneously changing the pitch of both propellers in predetermined relation to each other, which may be at the same rate or at different rates. Changing the propeller pitches at different rates provides different pitches on the two propellers and compensates the rear propeller for the effect of the slip stream of the front propeller so that the rear propeller may operate in that slip stream efficiently at all pitches and assume its share of the load.

The propeller pitch may be changed under control of a speed governor to maintain substantially constant speed of the propeller or engine, or the propeller pitch may be changed under manual control to set the pitch at any selected value, or to feather, unfeather, reverse, or unreverse the propeller pitch. Placing the propeller blades in the feathered position reduces drag and prevents turning of the engine by the propeller or "windmilling" during flight. Placing the blades in reverse pitch permits the propeller to act as a brake, both during flight or upon landing and assists in maneuvering a seaplane or flying boat on water.

In accordance with the present invention, each separate propeller is a substantially complete unit in itself. There are only two outside connections, one of which is a connection for operating the fluid-pressure-producing pumps, and the other of which is a connection for controlling the propeller pitch, both of which are mechanical connections.

While other forms of pitch changing mechanism may be utilized and various modifications made, the propeller described in this application is particularly adapted for use with the type of pitch changing mechanism shown in U. S. application Serial No. 482,265, now abandoned, filed April 8, 1943, by John E. Anderson for Pitch Changing Mechanisms, U. S. application Serial No. 464,620, filed November 5, 1942, by Erle Martin for Propeller Controls, and U. S. application Serial No. 422,252, now abandoned, filed December 9, 1941, by Donald W. Perin and Nelson R. Richmond for Propeller Control Means. The propeller may be either a tractor propeller or a pusher propeller; but for the purposes of this specification, will be treated as a tractor propeller. It should be understood, however, that the invention is not limited to that type of propeller.

Referring to the drawings which disclose the now preferred embodiment, in general, each unit of the propeller comprises four blades having shanks 208, 708 mounted for pitch changing movements in hubs 40, 540. Each blade shank has a pitch changing hydraulic motor 28, 528 having one part thereof splined to the interior of the blade shank and having another part drivingly connected as at 330 (Fig. 17) with the hub. Operation of the pitch changing motors 28, 528 is controlled by propeller-carried valves 26, 526 which control the flow of hydraulic fluid under pressure from pump manifold 148 to the motors and the return of fluid from the motors to the sump 138, 638. Valves 26 and 526 are mechanically connected together by a running joint including a flange 302 so that they will move together. Each valve has a follow-up connection with the blades of its propeller to cut off the flow of fluid when the blades have reached a position corresponding to the position of the valves 26, 526. The valves 26, 526 are controlled through a mechanical running joint including a flange 282 movable in a fore-and-aft direction by servo-motor-actuated rack 80. The position of the servo-motor, and hence of rack 80, is determined automatically by means of governor 32 or is determined manually by means of solenoid actuated valves 86, 88 or 96. Rack 80, servo-motor 74, governor 32, and the solenoid actuated valves are all supported on a stationary housing 30 bolted to the engine nose.

Pressure is supplied to manifold 148 and the corresponding manifold of the front propeller by a series of propeller-carried pumps actuated by rotation around stationary cams 114, 614. These pumps are mounted in and draw fluid from propeller-carried sumps 138, 638 and deliver it at high pressure to manifold 148 and the corresponding manifold of the front propeller from where it is controlled by valves 26, 526.

Specifically, an engine is schematically indicated at 10 as driving a propeller shaft 12. The propeller shaft 12 carries at its forward end the forward unit or front propeller of the dual propeller. Propeller shaft 14, concentric with and surrounding propeller shaft 12, carries the rear unit or rear propeller. The two shafts 12 and 14 may be driven in opposite directions at any preselected relative speeds by any desired mechanism and are shown as driven at the same speed and in opposite directions by a train of bevel gears 16, 18 and 20; the gears 18 rotating about axes held stationary in the engine nose or reduction gear housing, not shown. A bearing 22 maintains the alignment between the forward end of shaft 14 and the intermediate portion of shaft 12.

The two units of the dual propeller are similar in many respects, except that the front propeller is mounted on a smaller shaft than the rear propeller. The rear propeller will be described in detail and will serve as a description of the front propeller for all of the common features. The differences in the front propeller unit will be pointed out hereinafter in the description of that unit. The common features of the two propellers are indicated by the same reference numerals except that those indicating portions of the front propeller are larger by 500, than those indicating portions of the rear propeller.

The propeller comprises the two rotating propeller units and a stationary control unit. Each propeller unit has its own pumps located in housings 24 and 524, respectively, its own control valves 26 and 526, respectively, and its own pitch changing motors 28 and 528, respectively. The control valves are both actuated from a control unit indicated generally at 30 and secured to the engine nose by cap screws 31. The control unit is, therefore, held against rotation. Motion is imparted to the control valves from the stationary control unit through a mechanical running joint. The control unit 30 is shown in Fig. 4 and includes a governor indicated generally at 32, a manual control shown as switches O, G, F and R controlling a solenoid pack and indicated generally at 34, and an unfeathering motor 36. The governor is driven through a gear train including gear 42 from gear 38 secured to, and rotatable with, hub 40 of the rear propeller unit. Hub 40 is splined at 46 on shaft 14 and is centered by means of the usual cones 42 which are forced into place by the nut 44 (Fig. 1). The governor may be of the compensating type as shown in U. S. application Serial No. 422,252, now abandoned, filed December 9, 1941, by Donald W. Perin and Nelson R. Richmond, for Propeller Control Means, or U. S. application Serial No. 430,095, which became Patent #2,391,323, filed February 9, 1942, by Erle Martin, for Power Plant Control Means, but for purposes of simplicity, is shown as a simple governor in which the gear train drives a shaft 43 which, at its upper end, carries flyballs 45. Flyballs 45 actuate a sleeve valve 46 to control the flow of oil to and from conduit 48. The flyballs are balanced against a spring 50, the tension of which is controlled through rack and gear mechanism operated by shaft 52 which, in turn, may be controlled by the operator or automatically through any desired means, such as a pulley and cable or an electric motor. A spring 54 opposes spring 50 so as to center the governor at some preselected intermediate setting in the event of failure of the operator controlled mechanism. Fluid under pressure for the governor is supplied by a pump, normally located at 56 and driven from shaft 43 but shown schematically at 58, which draws fluid from the governor sump 60 through conduit 62 and discharges fluid under pressure through conduit 64 to the flyball actuated sleeve valve 46. The pressure generated by the pump is limited by relief valve 66.

When the propeller is rotating faster than the speed for which the governor is set, flyballs 45 are thrown outwardly and raise the sleeve 46 to connect conduit 48 with the space around the reduced portion 68 of pilot 70 which space is connected through the interior of the governor housing with sump 60, thus relieving the pressure in conduit 48. As will be explained in more detail hereinafter, this reduces the pressure in chamber 72 of servo-motor 74 permitting it to move under the influence of spring 84 to the left, as seen in Fig. 4, which, in turn, causes an increase in the pitch of both propellers. Conversely, if the propeller speed is lower than that for which the governor is set, the flyballs 45 are forced inwardly by spring 50, thus lowering sleeve 46 and connecting conduit 48 with the space around the reduced portion 76 below land 78 of pilot 70, which space is continuously connected with the fluid pressure line 64. As will be explained in more detail hereinafter, this action introduces fluid under pressure into the space 72 of servo-motor 74 forcing it toward the right, as seen in Fig. 4, which will reduce the pitch of the blades of both propellers, thus tending to restore the speed to that for which the governor is set.

Servo-motor 74 actuates rack 80 which meshes with a ring gear 82 (Figs. 1, 4 and 5) and by means explained hereinafter, actuates control valves 26 and 526 to change the propeller pitch. Ring gear 82 is concentric with gear 38, as shown in Fig. 1, but does not appear so in Fig. 4 because the entire lower portion of the figure has been dropped in order to show the oil lines schematically. Rack 80 is continuously urged in one direction (to the left in Fig. 4) by spring 84 and may be forced in the opposite direction by fluid under pressure in chamber 72 of servo motor 74, which is positioned to push on one end of the rack. Movement of rack 80 in either direction is limited by stop 100 which normally projects into the path of stop nuts 102 and 104 to determine a high pitch and a low pitch position for the propeller. Stop 100 may, however, be withdrawn by its associated solenoid to permit further movement of rack 80 to position the propeller in either feathered or reverse pitch position determined by stop nuts 103 or 105, respectively contacting with the control housing. Mechanical stops 107, 109 similar to the mechanical stops in Patent No. 2,174,717 are provided on the blade connecting gear and are preferably set at a position just beyond the range determined by stop nuts 103, 105.

As has been previously explained, the governor controls the introduction and drainage of fluid under pressure to and from the chamber 72. This fluid is further controlled by solenoid actuated valve 86 of the solenoid pack 34 which is located in line 48 and is normally open as shown in Fig. 4 to connect the governor with the space 72. The solenoid may be energized to close valve 86 and disconnect the governor from the chamber 72, thus locking fluid, preferably oil, in the chamber 72 and preventing pitch change in either direction thus, in effect locking the propeller pitch. With valve 86 closed, the solenoid of solenoid-actuated valve 88, which is normally closed, may be energized to open the valve and connect pressure line 90 with manifold 92, having a connection 94 with the chamber 72, to force the piston 76 of servo-motor 74 to the right, as shown in Fig. 4, and thus cause a reduction of the propeller pitch.

Alternatively with valve 86 closed, the solenoid of solenoid-actuated valve 96, which is normally closed as shown in Fig. 4, may be energized to open valve 96 thus connecting manifold 92 with conduit 98, which is connected with the governor sump, thus relieving the pressure in chamber 72 so that spring 84 can force the rack 80 to the left as shown in Fig. 4 and cause an increase in propeller pitch. By selectively actuating these valves and stop 100, the pitch may be automatically controlled by the governor or may be manually controlled to place the blades selectively in either a predetermined high pitch position, a predetermined low pitch position, a feathered position, a reversed pitch position, or the blades may be locked in any desired intermediate position. The position of the blades may be continuously indicated to the operator by remote indicating means shown generally at 106, and which are actuated from rack 80 by means of gear 108 (Fig. 1). The remote indicating means may be of any desired construction, but is preferably of the electrical type such as described in U. S. application Serial No. 422,252, now abandoned, filed December 9, 1941, by Donald W. Perin and Nelson R. Richmond for Propeller Control Means, or U. S. application Serial No. 446,962 filed June 13, 1942, by Nelson R. Richmond for Remote Indicating Means which became Patent No. 2,393,189.

Housing 24 mounted on and rotatable with hub 40 carries a plurality of pumps actuated by rotation of the rear propeller. As shown in Figs. 3, 5, 8, 9, and 10, the now preferred embodiment utilizes a two-step piston pump having a piston 110 of one diameter and a piston 112 of a smaller diameter integral with piston 110. These pistons are reciprocated in one direction, outwardly, by being carried with the propeller around a stationary cam 114. Cam 114 is formed on one end of a sleeve 120 and rotatably supported on hub 40 by bearings 116 and 118. The opposite end of the sleeve carries a gear 122 which, as shown in Fig. 4, meshes with gear 124 normally held against rotation by pawl and ratchet mechanism 125. Rolls 128 carried by pistons 110 and 112 are held against cam 114 by a ring 130 (Figs. 1, 3, and 8) which surrounds cam 114 and the several rolls 128. Ring 130 thus serves to hold pistons 110 and 112 inwardly toward the cam against the action of centrifugal force and to force rolls 128 to follow the cam to produce the intake stroke of the pump.

The outer end of piston 110 in its inward travel uncovers the outer end of slot 132 cut in pump cylinder 134 to allow for clearance of the ring 130, thus providing an inlet opening for the pump. The space above piston 110 is thus connected with the area surrounding cam 114, so that oil collecting in this area under the effect of either gravity or centrifugal force will find its way into a pump. As pump piston 110 is forced outward by the cam, the oil trapped by the piston 110 is forced through check valve 136 into sump 138. Pump piston 110 thus acts as a scavenge pump to return stray oil and lubricating oil to the sump.

Piston 112 on its inward stroke uncovers a slot 140 in the side of the pump cylinder 134 which connects the space above the piston 112 with the sump and acts as the intake opening for the pump. Oil trapped above piston 112 is forced through outlet valve 142 as the piston 112 is forced outward by the cam 114. After passing valve 142, the oil is led through holes 144 to the interior of hollow stud 146.

A manifold 148 extends around the interior of the pump housing, beginning at one hollow stud 146 and extending around the interior of the housing past each hollow stud to the last hollow stud in the series. Each stud 146 passes through the manifold and the interior of each stud is connected with the interior of the manifold by means of a hole 150. The pumps are all thus connected to a common, high-pressure manifold. Each pump cylinder is a separate unit secured into the pump housing by bolts 152.

The pump housing 24 has an undulating surface 154 on one side which matches with the surface of the hub around the blade sockets and over the web between the blade sockets. The undulations are hollow and form sump 138 in the pump housing. Housing 24 is secured to the hub by bolts or studs passing through webs 160 on the hub between the blade sockets and into the pump housing. These bolts are made hollow and act as hydraulic connections between the hub and the pump housing. One bolt comprises a hollow shell 156 (Figs. 1 and 3) passing through the sump and a stud 158 passing through the web 160 and threaded into hollow shell 156. A hollow stud 162 passes through manifold 148 and connects the interior of the manifold with the interior of the shell 156 which, in turn, is connected by passage 164 with the propeller control valve hereinafter described.

Another bolt comprises a shell 166 passing through the housing 24 and a stud 168 passing through the hub web 160 and threaded into the shell 166. Stud 168 carries a valve 172 and a packing 174 dividing the interior of shell 166 into two chambers. One chamber in shell 166 is connected by a hollow stud 170 with the interior of manifold 148. Holes 175 and 176 through the sides of shell 166 and stud 168 connect the other chamber in the shell with the sump 138. Valve 172 thus acts as a relief valve for the high-pressure manifold.

Another bolt comprises a shell 178 passing through the housing 24 and a hollow stud 180 passing through the hub web and threaded into the shell. The interior of stud 180 is connected by a passage 182 with the interior of the propeller hub, and the interior of shell 178 is connected by means of holes 184 with sump 138. This bolt thus acts as a drain for the hub barrel to the sump. The end of the shell 178 opposite the hub carries a relief valve 186 which, by means of a passage 188 and hole 190, acts as a relief valve for the sump 138, emptying into the area surrounding the cam 114.

In a four-bladed propeller, such as is shown in the accompanying drawings, a fourth bolt is provided which ordinarily has no function in addition to the primary function of drawing the housing 24 into close contact with the hub 40 and holding it in such position.

In the propeller disclosed in this application, however, the fourth bolt is utilized for conducting deicing fluid through the rear propeller to the front propeller. As shown in Fig. 16, the rear propeller is provided with a slinger ring 332 which may be fed in the usual manner with deicing fluid through a stationary pipe, not shown. Slinger ring 332 is bolted onto the rear of pump housing 24 and has four outlets, one for each blade. One outlet, 334, is shown in Fig. 1, leading to a hollow bolt 336 which, in turn, feeds a pipe 338 leading to a trough 340 on the propeller blade shank from where it is distributed, by means not shown, to the leading edge of the propeller blade.

Slinger ring 332 has an annular channel 342 therein which also receives fluid from the stationary pipe feeding the slinger ring. Channel 342 has an outlet 344 connecting the channel with the interior of the fourth hollow bolt 346. In order to reduce the quantity of deicing fluid in bolt 346, a small conduit 348 may be supported therein by some light material such as cork or expanded rubber 350. Stud 352 is threaded into bolt 346 to hold the various parts in position. A pipe 354 is fitted with an oil-tight connection into stud 352 and is supported by frame 355 secured by stud 310 on oil guard 308 between the propellers. Pipe 354 discharges deicing fluid into slinger ring 832 on the front propeller. Deicing fluid is led through four outlets, one of which 834 is shown in Fig. 1, to hollow bolts 836, pipes 838, and troughs 840 as in the rear propeller.

In order to secure an oil-tight joint between the housing 24 and the hub 40, an O ring packing 192 (Figs. 6 and 7) is secured in a groove 194 in the undulating surface of the housing 24. The joint between the stationary control unit 30 and the rotating pump housing 24 is sealed by a carbon and steel face seal. Various means for holding the carbon and steel elements in contact may be used, and in the structure disclosed, the holding means comprises a bellows 196 secured at one end to the stationary control unit and carrying at its other end one of the sealing members 198 on which the other sealing member 200 runs. The sealing of the area within control unit 30, pump housing 24, and around the cam sleeve 120 is completed by a flat packing between the face 202 of the control bracket and the nose of the engine, not shown.

Cavities 204 are provided around the circumference of pump housing 24 and selected ones may be used to receive balancing weights 206.

Each blade shank 208 is rotatably secured in a socket in hub 40 by means of bearings 210. Each blade contains a pitch changing motor 28 which, in the construction shown, is a vane motor of the type described in detail in U. S. application Serial No. 474,638, filed February 4, 1943, by John E. Anderson and Arthur N. Allen, Jr., for Propellers which became Patent No. 2,533,415. Oil passages connect the interior of each vane motor 28 with circular grooves or channels 212 and 214 in propeller hub 40, channel 212 being continuously connected with one set of chambers 213, 213 in the vane motor 28 and the channel 214 being continuously connected with the opposite set of chambers 215, 215. When oil under pressure is supplied through channel 212 and channel 214 is connected with drain, the pitch will be changed in one direction, and when oil under pressure is supplied through channel 214 and channel 212 is connected with drain, the pitch will be changed in the opposite direction. Channels 212 and 214 are connected by passages 216 and 218 with a two-part follow-up valve 26 of the type shown in detail in U. S. application Serial No. 482,265, now abandoned, filed April 8, 1943, by John E. Anderson for Pitch Changing Mechanisms.

This valve has an outer sleeve 220 secured in hub 40 and having passages 224 and 226 connecting passages 216 and 218 with the exterior of one movable part 222 of the two-part valve. Part 222 is connected by means presently to be described with the propeller blades so that it occupies a definite and different position for each blade pitch position. The other part 228 of the two-part valve is connected for operation by rack 80 of the control unit.

Part 222 is operated from the propeller blades as follows: Each blade has a bevel gear 230 secured to one end thereof. A bevel ring gear 232 connects all of these blades and carries in a recess on its outer periphery a ring 234 which, in turn, has teeth 236 cut in a portion of its periphery. Ring 234 is indexed on gear 232 by means of a pin 239 which fits between two teeth of the series of internal gear teeth 238 cut in a portion of the inner circumference of ring 234 and which is fixed in a solid portion at the bottom of the recess in ring gear 232. Teeth 236 on the outside of ring 234 mesh with an idler gear 240 which, in turn, meshes with a gear 242 on cam sleeve 244. Sleeve 244 is rotatably supported on an extension of fixed sleeve 220 and held against longitudinal movement thereon between the shoulder 247 and snap ring 248. Sleeve 244 has a spiral cam slot 250 in which cam follower 252 is guided.

Follower 252 is rotatably supported on a pivot 254 secured in an extension of valve part 222. A boss 256, Fig. 13, on this extension is guided in a slot 258 in sleeve 220, thus holding part 222 against rotation but permitting the longitudinal movement thereof. From the construction so far described, it is apparent that rotation of the blades in pitch changing movement will cause rotation of cam sleeve 244 which, in turn, will cause longitudinal reciprocation of valve part 222 giving the valve part a definite and different position for each pitch position of the blade.

The other valve part 228 is arranged in telescoping relation with and inside of valve part 222 and has lands 260 and 262 (Fig. 5) cooperating with ports 264 and 266 in valve part 222. A bushing 268 surrounds the outer end of valve part 228 and is spring-pressed by spring 270 to force a notch in the end of the bushing against an inward extension of pivot 254. Bushing 268 carries a pin 272 which passes through a slot 271 in valve part 228, thus preventing valve part 228 from rotating with respect to valve part 222 but permitting relative longitudinal movement of the two valve parts and urging valve part 228 to the left as seen in Figs. 1 and 5. An extension 274 is threaded into the inboard end of valve part 228. Extension 274 passes through a hole in sleeve 276 (Figs. 1 and 14) secured to fixed sleeve 220 by a snap key 278 and is held against rotation by a flat side in the hole coacting with a flattened face 280 on extension 274. Longitudinal adjustment is thus provided for valve member 228. Extension 274 carries an "Oil-lite" button at its inner end which is urged into contact with a non-rotating flanged member 282 by spring 270. A cylindrical extension 284 of flanged member 282 extends within a sleeve 288 which has ring gear 82 formed at one end thereof. Sleeve 288 is mounted for rotational movement on, and held against axial movement by, bearing 286 (Fig. 5) secured in the housing of control unit 30. Sleeve 288 carries rolls 290 which engage in axially directed slots 292 in cylindrical extension 284 of flange 282. Rolls 294, secured to the housing for control 30, operate in spiral slots 296 in cylindrical extension 284. Longitudinal movement of rack 80 will, therefore, rotate cylindrical extension 284 and through rolls 294 and slots 296 cause axial reciprocation of flange 282 which, in turn, will impart corresponding longitudinal movement to valve part 228. Hence, valve part 228 will have a definite and different position for each position of rack 80.

As has been previously described, oil under pressure is led through conduit 164 to the control valve. Movement of valve part 228 will connect one of the ports 264, 266 with oil under pressure and the other port with drain, the outboard end of the valve being opened to the interior of the propeller hub and the valve part 288 being hollow and having holes 298 leading from the exterior to the interior of the valve part. Oil under pressure thus being led to the vane motor, changes the blade pitch and turns ring gear 232 and gear 236 to move valve part 222 to shut off the flow of oil when the blade pitch has changed an amount determined by the position of the valve part 228, thus each position of rack 80 has a corresponding definite position of the blade pitch. As has been previously indicated, oil may be led from the interior of hub 40 back to the sump 138 through passage 182, stud 180, shell 118, and holes 184.

The front propeller hub is substantially a duplicate of the rear propeller hub except that it is smaller in size because it is mounted on a smaller shaft, the pump cam 614 is driven from rear propeller hub 40 instead of being held against rotation and there is no separate control unit 30 for the front propeller.

In place of a separate control unit, valve part 228 is extended by extension 300 to contact a flange 302 having a cylindrical extension 304 held against relative rotation with respect to, and mounted for axial movement with respect to sleeve 306. An oil guard 308 (Figs. 1 and 15) is mounted on hub 40 by means of cap screws 310 and provides a support for valve extension 300. Sleeve 306 is supported on, and rotates with, sleeve 312 carrying cam 614. A lug 314 secured to sleeve 312 passes through sleeve 306 and contacts a projection 315 extending inwardly from oil guard 308 into the path of lug 314. Projection 315 thus rotates cam 614 with the rear propeller. A sleeve 316, pinned to hub 540 by pin 318, carries a groove 320 in which a thrust shoe 322 carried by sleeve 312 rotates to prevent axial movement of sleeve 312 with respect to hub 540. Cam 614 is carried on hub 540 by bearings 616 and 618 in the same manner as in the rear propeller. An oil seal is provided between the pump housing 524 and the oil guard 308 by bellows 696 and sealing members 698 and 700 and seals the front hub in a manner similar to the manner in which the rear hub is sealed.

Because the cam 614 rotates at twice the relative speed with respect to the pumps in housing 524 as cam 114 rotates with respect to the pumps in housing 24, the pumps of the front propeller, if identical with the pumps of the rear propeller, would pump twice as much oil. In the now preferred embodiment, in order to have the two propellers pump approximately the same quantity of oil, the pumps of the front propeller are reduced in diameter to give them approximately half the capacity of the pumps of the rear propeller. It should be understood, however, that the same result can be accomplished by either reducing the stroke of the cam or by rendering half of the pumps inoperative and thus making them in effect dummies.

Control valve 526 is actuated from flange 302 in the same manner that control valve 26 is operated from flange 282. Valve extension 574 is pressed against flange 302 which flange, in turn, is pressed against valve extension 300 by spring 770 so that each movement of rack 80 imparts equal and simultaneous movements to valve parts 228 and 728, thus giving a definite pitch position to each position of rack 80.

The spiral cam 760 in cam sleeve 744 may be shaped to position the front propeller in any predetermined relation with respect to the rear propeller, thus the front propeller may be positioned at the same, but, of course, oppositely directed pitch as the rear propeller or, as is now preferred, it may be positioned at some selected proportion of the pitch of the rear propeller so as to compensate for the effect of the slipstream of the front propeller on the rear propeller and give equal power absorption to the two propellers.

The operation of this propeller is as follows: With the switches G, F, and R set, as shown in Fig. 4, and switch O either on or off, the governor is connected through valve 86 with servo-motor 74 and actuates rack 80 in response to speed changes simultaneously changing the pitch of both units of the propeller to maintain substantially constant speed of the propeller. With switch O turned to the "on" position and with switch G turned to the "off" position (switches F and R remaining as shown in Fig. 4), valve 86 will be actuated to block off the governor from servo-motor 74 and oil will be trapped in servo-motor 74 and the pitch locked.

With switch O turned to the "on" position and switch G turned to the "on" or "off" position and switch F to the "feathered" position, solenoid valve 86 is actuated to disconnect the governor; solenoid valve 96 is actuated to connect the servo-motor with drain; stop 100 is withdrawn; and motor 36 is energized. Draining fluid from servo-motor 74 and withdrawing the stop 100 will allow spring 84 to move rack 80 and, in turn, move valve parts 228 and 728 to the extreme high pitch position. Due to the rapidity of the pitch change in the propeller, the blades of both propellers will be moved into an extreme feathered position determined by the position of the valve parts 228 and 728 before the increased resistance to rotation of the feathered or nearly feathered blades stops rotation of the propeller. In the event the propeller stops rotation before it is completely feathered, the motor 36 will operate to supply fluid to feather the rear unit. The feathered position is determined by adjustable nut 103 contacting housing 30.

With the blades completely feathered and with neither the engine nor the propeller rotating, the propeller may be unfeathered by placing switch O in the "on" position, switch G in the "on" position, and switch F in the "unfeathered" position. Solenoid actuated valve 86 will thus be energized to disconnect the governor. Motor 36 will be energized and will rotate gear 324 (Fig. 4) which is in mesh with gear 122 on cam sleeve 120. Gear 324 carries an eccentric 326 which operates a plunger pump 328 drawing oil from governor reservoir 60 and pumping it through manifold 92 into servo-motor 74, thus supplying oil under pressure to operate servo-motor 74 when gear pump 58 is not operating. Oil under pressure directed to the servo-motor 74, operates rack 80 and allows spring 270 and 770 to place valve parts 228 and 728 in the low pitch position determined by stop 100 and stop nut 102. It is unnecessary to energize solenoid 100 for unfeathering because the stop does not project back of stop nuts 104, 105 when in feathered position and hence does not act as a stop under those conditions. Operation of motor 36 will rotate cam 114 which, in turn, will operate the pumps of the non-rotating rear unit of the propeller to supply oil under pressure to the pitch changing motors to turn the blades in a pitch-reducing direction. Although the valve part 728 has been positioned to reduce the blade pitch on the front propeller, no oil under pressure is being supplied to the pitch changing motors of the front unit because there is no relative motion between cam 614 and the pumps in housing 524. As the pitch of the rear propeller blades is reduced in flight, the rear propeller is caused to windmill which, in turn, will rotate the front propeller, thus supplying the necessary pitch changing oil pressure to the front propeller so that it will start to reduce its pitch. After the propellers have started to rotate, switch F may be returned to the neutral position, leaving switches O and G in the "on" position, under which conditions the governor will take over control of the propeller pitch and the propeller will continue to operate as a constant speed propeller.

By this construction it is possible to unfeather both propellers using an unfeathering motor 36 only large enough to actuate the pumps of one unit of the propeller, thus giving a lighter construction than if it were necessary to operate the pumps of both units by the unfeathering motor in order to unfeather.

The propeller may be placed in a reversed pitch position by placing switch O in the "on" position, switch G in the "on" position, and switch R in "reverse" position. Solenoid actuated valve 86 will thus be energized to disconnect the governor; solenoid actuated valve 88 will be actuated to supply oil under pressure to the servo-motor 74; and stop 100 will be withdrawn so that servo-motor 74 may move rack 80 past the low pitch position and into reverse pitch. Valve parts 228 and 728 will then be placed in the extreme reverse pitch position by springs 270 and 770 and by hub oil pressure acting on valves 228 and 728 and the blades will follow changing their pitch to the reverse pitch position.

By now turning switch R to the unreversed position, solenoid actuated valve 88 will be de-energized and closed; stop 100 will be returned to active position; and solenoid actuated valve 96 will be energized to connect servo-motor 74 with drain, thus allowing spring 84 to move rack 80 and position valve parts 228 and 728 in the high pitch position determined by stop 100 and stop nut 104. As in the feathered position, stop 100 does not act as a stop when the rack is in reversed position because the stop does not project in back of nuts 102, 103. The control valves 26 and 526 will then direct oil to the pitch changing motor to increase the blade pitch, changing it from reverse to forward pitch.

In the present construction it has been found that the change of pitch from forward to reverse or from reverse to forward is sufficiently rapid so that it is unnecessary to throttle the engine materially, the pitch changing so fast that the engine speed does not increase beyond allowable limits during the short time the propeller is passing through the O pitch position.

From the above description it will be apparent that applicant has invented a dual-rotation propeller in which each unit has its own pressure source, its own control valve, and its own pitch changing motor and in which the pitch of both propellers may be simultaneously increased or decreased either the same amount or in any preselected proportion. The pitch of both propellers will start to change simultaneously and it is not necessary for the pitch of one propeller to change before the other one can start to change. An expenditure of auxiliary power sufficient to actuate the pitch changing mechanism of only one propeller is sufficient to bring both propellers out of the feathered position. By blocking the connection between the governor and the servo-motor, it is possible to lock the blades in any desired pitch position which pitch position can be changed by momentarily actuating the feather-unfeather switch or by temporarily unblocking the line between the governor and the servo-motor and setting the governor for a different speed and then again blocking the line between the governor and the servo-motor.

It is to be understood that the invention is not limited to the specific embodiment herein illustrated and described, but may be used in other ways without departure from its spirit as defined by the following claims.

I claim:

1. In an oppositely rotating coaxial type of propeller, a pair of hubs adapted to be driven in opposite directions from a pair of oppositely rotating drive shafts each hub having a plurality of blade sockets adapted to receive and adjustably support a propeller blade, power actuated means carried by each hub for adjusting the pitch of said blades, means in each hub energized by rotation of said hub for developing power to effect actuation of said power actuated means, control means in each hub including a follow-up connection with the propeller blades of that hub for controlling the application of said developed power to maintain a predetermined position of said blades, and means for correlating the action of the controlling means in said two hubs to correlate the position of the blades of said two hubs.

2. A dual-rotation propeller of the character described comprising, a pair of hubs adapted to be mounted on concentric oppositely rotating drive shafts, each hub having a plurality of blade sockets adapted to receive and adjustably support a propeller blade, hydraulically actuated means carried by each hub for adjusting the pitch of said blades, a fluid reservoir carried by each hub, a pressure manifold carried by each hub, pumps carried by each hub for taking fluid from the respective reservoir, increasing its pressure, and directing it to the respective pressure manifold, means for actuating said pumps, valve means, including a follow-up mechanism, carried by each hub for directing fluid from said pressure manifold to said hydraulically actuated pitch changing means, said follow-up mechanism cooperating with its valve to position each blade in accordance with the position of said valve, means interconnecting the valves of said two hubs, and means for selectively positioning said valves.

3. A dual-rotation propeller of the character described comprising, a pair of hubs adapted to be mounted on concentric oppositely-rotating drive shafts, each hub having a plurality of blade sockets adapted to receive and adjustably support a propeller blade, hydraulically actuated means carried by each hub for adjusting the pitch of said blades, a fluid reservoir carried by each hub, a pressure manifold carried by each hub, pumps carried by each hub for taking fluid from the respective reservoir, increasing its pressure, and directing it to the respective pressure manifold, means for actuating said pumps, valve means, including a follow-up mechanism, carried by each hub for directing fluid from said pressure manifold to said hydraulically actuated pitch changing means, said follow-up mechanism cooperating with its valve to position each blade in accordance with the position of said valve, means interconnecting the valves of said two hubs, and means for selectively positioning said valves including means for positioning said valves to reverse the pitch of said blades.

4. In combination in a dual-rotation propeller having two adjustable pitch propellers each having a hydraulic pitch changing motor and a two-part follow-up valve controlling said motor, means for simultaneously actuating both valves to simultaneously control both motors comprising means operatively connecting one part of each valve with its pitch changing motor, means interconnecting the other part of both of said valves, means including a single servo motor acting through said interconnecting means for simultaneously actuating said other part of said valves, and means for locking said other part of both valves in any selected position.

5. In combination in a dual-rotation propeller having two adjustable pitch propellers each having a separate pitch changing motor and a separate two-part follow-up control device controlling said motor, means for simultaneously actuating both said devices to simultaneously control both motors comprising means operatively connecting one part of each said control device with the blades of its propeller for positioning said one part in accordance with the position of the propeller blades, means interconnecting the other part of both of said devices, and means including a single servo motor acting through said interconnecting means for simultaneously actuating said other parts including means for locking said other parts of both devices in any selected position.

6. In combination in a dual-rotation propeller having two adjustable pitch propellers each having a separate pitch changing motor and a separate two-part follow-up control device controlling its respective motor, means operatively connecting one part of each said control device with the blades of its propeller for positioning said one part in accordance with the position of the propeller blades, means for simultaneously actuating both valves to simultaneously control both motors including means interconnecting the other part of both of said devices, a governor acting through said interconnecting means for simultaneously actuating said other parts, means for simultaneously manually controlling said other parts including means for disabling said governor control, and means forming part of said manual control for locking the blades in any selected pitch position.

7. In combination in a dual-rotation propeller having two adjustable pitch propellers each having a separate pitch changing motor, control means carried by each hub for controlling the actuation of its respective pitch changing motor, each control means having a connection with the blades of its respective propeller for determining the pitch position of the blades of the respective propeller for each position of the respective control means, a governor for simultaneously regulating both said control means, and means for disabling said governor and simultaneously locking both said control means in any selected position.

8. In combination in a dual-rotation propeller having two adjustable pitch propellers each having a separate pitch changing motor, control means carried by each hub for controlling the actuation of its respective pitch changing motor, each control means having a connection with the blades of its respective propeller for determining the pitch position of the blades of the respective propeller for each position of the respective control means, a governor for simultaneously regulating both said control means, means for disabling said governor and manually controlled means for simultaneously actuating both control means while the governor is disabled for simultaneously reversing the pitch of the blades of both propellers.

9. In combination in a dual-rotation propeller having two adjustable pitch propellers each having a separate pitch changing motor, control means carried by each hub for controlling the actuation of its respective pitch changing motor, each control means having a follow-up connection with the blades of its respective propeller for determining the pitch position of the blades of the respective propeller for each position of the respective control means, a governor for simultaneously regulating both control means, means for disabling said governor regulation and manually controlled means for simultaneously actuating both control means while the governor is disabled to simultaneously feather both propellers.

10. A dual-rotation propeller of the character described comprising, a pair of hubs adapted to be driven from concentric oppositely rotating drive shafts, each hub having blade receiving sockets adapted to receive and adjustably support propeller blades therein, and a pitch changing fluid motor in each socket, a fluid reservoir carried by each hub and means carried by each hub and connected with said reservoir for developing fluid pressure, a control valve in each hub for controlling the application of said fluid pressure to said motor, means directly mechanically connecting said valves and non-rotating means outside of said propeller hubs directly mechanically connected with both said valves for simultaneously adjusting both of said control valves to adjust the pitch of both propellers simultaneously.

11. A dual-rotation propeller of the character described comprising, a pair of hubs adapted to be mounted one each on concentric oppositely-rotating drive shafts, each hub carrying its own adjustably mounted blades, its own pitch changing motor means, its own power supply means for said pitch changing motor means energized by rotation of said hub, and its own control mechanism for controlling the supply of power from the power source to said pitch changing motor means, mechanism directly mechanically connecting the two control mechanisms, a separate stationary control, and means directly mechanically connecting said stationary control with one of said control mechanisms and through said connecting mechanism directly mechanically connecting said stationary control with the other of said control mechanisms for simultaneously proportionally actuating the control mechanisms of both propeller hubs by movement of said stationary control.

12. A device as claimed in claim 11 in which said stationary control includes a governor driven by one of said propeller hubs.

13. A device as claimed in claim 11 having means for locking both of said control mechanisms in any desired position.

14. A device as claimed in claim 11 having means for positioning the propeller blades in accordance with the position of the respective control mechanism and means for locking the control mechanism in any desired position, thus locking the separate propellers in any desired pitch position.

15. A device as claimed in claim 11 including means for simultaneously positioning the control mechanism of both propellers to reverse the pitch of both propellers simultaneously.

16. A dual-rotation propeller of the character described comprising, a pair of hubs adapted to be mounted on concentric oppositely rotating drive shafts, each hub carrying adjustably mounted blades, hydraulically actuated pitch changing mechanism, and a two-part follow-up valve for controlling its respective pitch changing mechanism, means connecting one part of each valve with the blades of its hub, said connecting means including a cam, the cam of one hub having a different slope than the cam of the other hub, means operatively connecting the other part of said valves to each other, means for moving said connected parts in unison, said cams acting to give the blades of the two propellers different pitches and thus provide a balanced torque.

17. In combination with two coaxial oppositely-rotating interconnected adjustable-pitch propellers each having its own pitch changing motor and its own two-part follow-up devise for controlling said motor, one part of each device being actuated by the movement of the blades of its associated propeller, the other part of both devices being interconnected, means for feathering both of said propellers, and means for supplying energy to the pitch changing motor of one of said non-rotating feathered propellers for unfeathering said propeller, including means for moving both of said devices to a low pitch position.

18. In combination two drivingly interconnected engine-driven adjustable-pitch propellers each having its own separate pitch changing mechanism and its own power means for supplying energy to its respective pitch changing mechanism by rotation of said propellers, comprising auxiliary power means connected with one propeller for supplying energy during flight to the pitch changing mechanism of said one propeller, while said one propeller is feathered and not rotating, for unfeathering said one propeller, said power means of said other propeller being actuated by rotation of said one propeller for supplying energy to the pitch changing mechanism of said other propeller.

19. In combination with two interconnected adjustable-pitch propellers each having its own separate pitch changing mechanism and its own separate control device for said mechanism, means for unfeathering said propellers, comprising manually controlled means connected with one propeller for supplying energy to its pitch changing mechanism, while said one propeller is feathered and stationary but in flight, to unfeather said one propeller, said propellers being interconnected so that rotation of one causes rotation of the other, and means actuated by rotation of said one propeller for supplying energy to the pitch changing mechanism of said other propeller.

20. In combination with a pair of oppositely-rotating coaxial propellers, pitch changing mechanism carried by each propeller, power supply means energized by rotation of the respective propeller carried by each propeller for its respective pitch changing mechanism, said power supply means for one propeller comprising, means rotatable with said one propeller with respect to a non-rotating member, said power supply means for said other propeller comprising, means rotatable with said other propeller with respect to a reaction member connected with said one propeller, a motor, and means connecting said motor and said non-rotating member for rotating said non-rotating member to actuate the power supply means for said one propeller to supply power to said pitch changing mechanism of said one propeller when said one propeller is not rotating.

21. In combination with two associated propellers, fluid operated pitch changing mechanism carried by each propeller, a first cam, means for holding said cam against rotation, a pump carried by one propeller and actuated by said cam upon rotation of said propeller for supplying fluid under pressure to operate the pitch changing mechanism of said one propeller, a second cam, said second cam being driven by said one propeller, pumps carried by the other propeller and actuated by relative rotation of said second cam and said other propeller for supplying fluid under pressure to operate the pitch changing mechanism of said other propeller, a motor, and means connecting said motor and said first cam for rotating said first cam to actuate the pump of said one propeller while said one propeller is not rotating.

22. A dual-rotation propeller of the character described comprising, a pair of hubs adapted to be mounted on concentric oppositely-rotating drive shafts, each hub carrying the following elements: adjustably-mounted blades, hydraulically-actuated pitch changing mechanism, a fluid reservoir, a pump for removing fluid from said reservoir and increasing its pressure, a valve for directing fluid from said pump to said pitch changing mechanism, and means for actuating said pumps, said actuating means comprising, cams rotatably mounted on each hub, means carried by the cam of the front propeller coacting with means carried by the hub of said rear propeller for effecting rotation of said front propeller cam with respect to said front propeller, and means carried by the rear propeller cam for preventing rotation of said rear propeller cam, including gear means and an electric motor for driving said rear propeller cam when said propellers are not rotating.

23. A device as claimed in claim 22 including means for positioning said valves while said propellers are not rotating.

24. A device as claimed in claim 22 including means for positioning said valves when said propellers are not rotating, including a servo-motor, and a pump actuated by said electric motor for supplying fluid to said servo-motor.

25. A dual-rotation propeller of the character described comprising, a pair of drive shafts rotating in opposite directions, hubs positioned on each drive shaft in tandem relation to each other, a plurality of hydraulically-adjustable blades carried by each hub, a fluid-containing reservoir rotatable with each of said hubs, pump mechanism carried by each hub and communicating with said respective reservoirs, a stationary member operable upon the pump mechanism of the rear hub to provide for actuation thereof to subject fluid from the reservoir of the rear hub to pressure, a member connected with the rear hub and operable upon the pump mechanism of the forward hub to provide for actuation thereof to subject fluid from the reservoir of the forward hub to pressure, means within each hub for controlling the application of fluid pressure from the pump mechanism to the respective hydraulically-adjustable blades, means preventing rotation of said stationary member in one direction to prevent rotation thereof with the rear hub and its pump mechanism and means for actuating the pump mechanism of the rear hub when the hub is not rotating comprising a motor, and means connecting said motor and said stationary member in a direction opposite to said one direction to actuate the pump mechanism of said rear hub while said rear hub is not rotating.

26. In combination, with two coaxial, oppositely rotating, interconnected, adjustable pitch propellers, each propeller having a separate hydraulic pitch changing motor, a separate hydraulic pump actuated by rotation of the propeller to provide a separate hydraulic pressure source while the propeller is rotating, and a separate valve controlling the application of pressure from said source to the propeller pitch changing motor, means for feathering the propellers, means for initiating unfeathering of the stationary feathered propellers in flight comprising a motor, means connecting said last mentioned motor with the pump of one of said propellers for actuating said pump to provide an auxiliary source of hydraulic pressure while said propeller is stationary, and means for positioning the valve of said one propeller to direct pressure from said auxiliary source to the pitch changing motor of said one propeller to reduce the pitch thereof while stationary.

27. A dual-rotation propeller of the character described comprising, a pair of hubs adapted to be mounted on concentric oppositely rotating drive shafts, each hub carrying the following elements: adjustably-mounted blades, hydraulically-actuated pitch changing mechanism, a fluid reservoir, a pump for removing fluid from said reservoir and increasing its pressure, a valve for directing fluid from said pump to said pitch changing mechanism, and means for actuating said pumps, said actuating means comprising, pump drive means mounted adjacent each hub, means connecting the pump drive means of the front propeller with the hub of the rear propeller for effecting relative rotation of said front propeller pump drive means and said front propeller, and means connected with the rear propeller pump drive means for preventing rotation of said rear propeller pump drive means with said rear propeller including gear means and a motor for driving said rear propeller pump drive means when said propellers are not rotating.

28. In combination with two drivingly interconnected adjustable pitch propellers each carrying a separate pitch changing motor, separate mechanism energized by rotation of the respective propeller for developing power to effect actuation of its motor and a separate device for controlling the application of said power to said motor, means for unfeathering both of said propellers including means operatively connected with but one propeller for supplying energy thereto while said propeller is stationary, the control device for said one propeller including means for directing said energy to said pitch change motor of said one propeller to unfeather said stationary propeller, whereby both propellers will be rotated by the effect of relative wind on the unfeathered propeller, said control device for said other propeller directing power developed by rotation of said other propeller to unfeather said other propeller.

29. In combination with two coaxial oppositely-rotating interconnected adjustable-pitch propellers each having a separate hydraulic pitch changing motor, a separate power supply energized by rotation of the propeller and a separate valve for controlling the motor, means for feathering both of said propellers, means for unfeathering the stationary feathered propellers in flight comprising manually controlled means for supplying energy from said separate power supply to the pitch changing motor of only one stationary propeller for unfeathering the same and means for moving both of said valves toward low pitch controlling position.

30. In combination with the pitch changing mechanism of two drivingly interconnected engine-driven adjustable-pitch propellers each having its own separate pitch changing mechanism, energy supplying means comprising relatively rotatable means including propeller carried means actuated by rotation of said propellers for supplying energy to said separate pitch changing mechanisms during flight while the propellers are rotating and auxiliary power means for actuating said energy supplying means of one propeller for supplying energy during flight to the pitch changing mechanism of said one propeller while said one propeller is not rotating.

ERLE MARTIN.

REFERENCES CITED

The following references are of record in the file of this patent:

UNITED STATES PATENTS

| Number | Name | Date |
|---|---|---|
| Re. 23,253 | Blanchard et al. | Aug. 15, 1950 |
| 2,023,785 | Hoover | Dec. 10, 1935 |
| 2,123,057 | Martin | July 5, 1938 |
| 2,243,852 | Caldwell et al. | June 3, 1941 |
| 2,280,654 | Mader | Apr. 21, 1942 |
| 2,280,714 | Martin | Apr. 21, 1942 |
| 2,296,288 | Martin et al. | Sept. 22, 1942 |
| 2,307,102 | Blanchard et al. | Jan. 5, 1943 |
| 2,308,488 | Caldwell et al. | Jan. 19, 1943 |
| 2,362,444 | Blanchard et al. | Nov. 14, 1944 |
| 2,365,204 | Martin et al. | Dec. 19, 1944 |
| 2,403,532 | Hoover | July 9, 1946 |
| 2,417,870 | Haines | Mar. 25, 1947 |
| 2,470,560 | Hoover | May 17, 1949 |

FOREIGN PATENTS

| Number | Country | Date |
|---|---|---|
| 119,164 | Austria | Nov. 23, 1944 |
| 217,669 | Switzerland | Apr. 16, 1942 |
| 559,361 | Great Britain | Feb. 16, 1944 |
| 703,319 | Germany | Feb. 6, 1941 |